Dec. 27, 1966  E. RUCHSER  3,294,120
MULTIWAY CONTROL VALVES
Filed Jan. 15, 1964  4 Sheets-Sheet 1

INVENTOR
Erich Ruchser

Dec. 27, 1966   E. RUCHSER   3,294,120
MULTIWAY CONTROL VALVES
Filed Jan. 15, 1964   4 Sheets-Sheet 3

INVENTOR
Erich Ruchser
By Richard Low
Agt

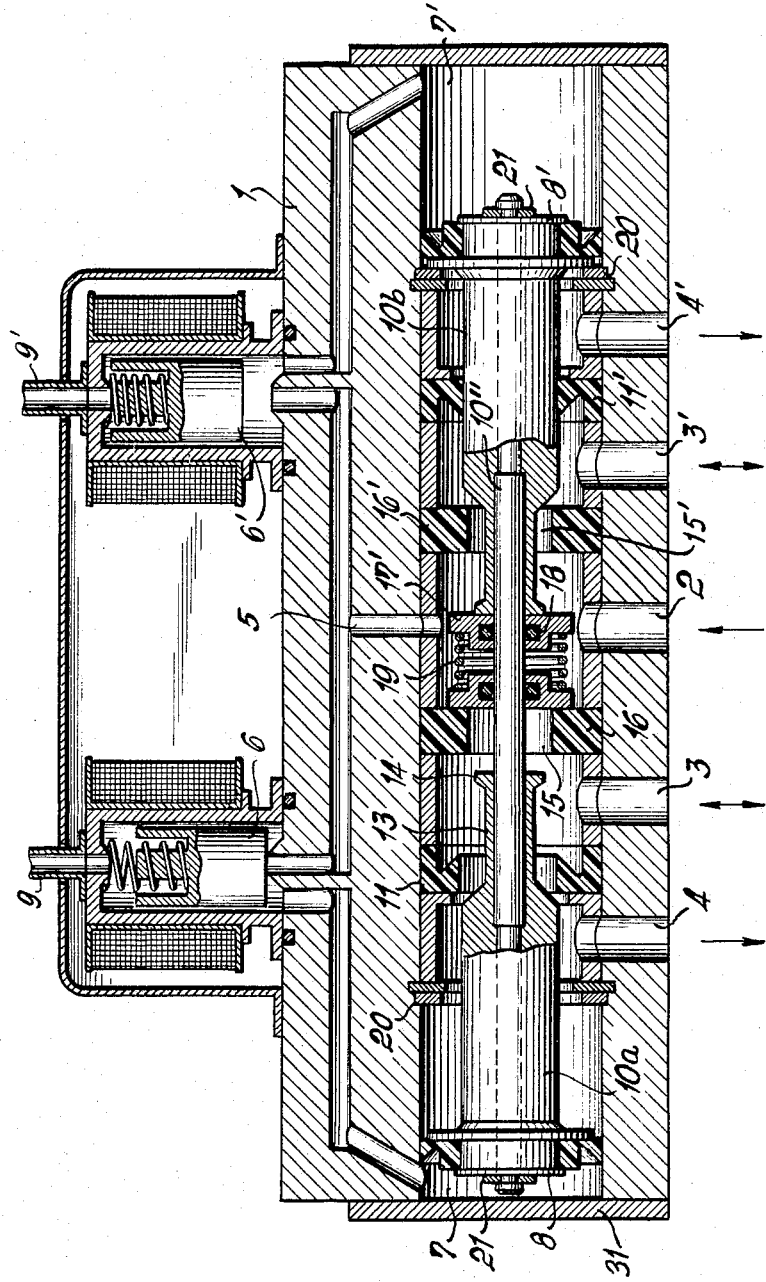

United States Patent Office 3,294,120
Patented Dec. 27, 1966

3,294,120
MULTIWAY CONTROL VALVES
Erich Ruchser, Rommelshausen, Germany, assignor to Erich Herion, Stuttgart-Frauenkopf, Germany
Filed Jan. 15, 1964, Ser. No. 337,902
Claims priority, application Germany, Jan. 23, 1963, H 48,032
10 Claims. (Cl. 137—627.5)

This invention relates to control valves and more particularly to a pilot-operated three-position control valve for operating hydraulic actuators and the like.

Known control valves for this purpose are usually slide valves in which axially movable valve pistons are sealed to an apertured cylinder by O-rings or lipped seals. In this arrangement, the edges of the cylinder apertures cut across the seals when a valve piston is shifted, so that the life of the seals is rather short. It is also known to use disk or lift valves. In this type of valve slight changes in the positions of the cooperating sealing surfaces, due for instance to one-sided wear of a valve seat, impair tightness.

It is an object of the invention to maintain tight seals in such valves for longer periods of time. Another object of the invention is the provision of a control valve adapted to block a hydraulic actuator or the like when the valve is in a neutral position without requiring critical dimensional tolerances.

With these and other objects in view, the invention in one of its aspects, resides in a control valve the casing of which is provided with inlet means, two controlled outlets, and two return outlets which communicate with respective portions of a cavity in the casing. Two plungers in the cavity are each movable toward and away from a blocking position in which a portion of the cavity communicating with one of the controlled outlets is blocked by the plunger from another cavity portion which communicates with the return outlet. The two plungers are connected by motion transmitting means so that one moves away from its blocking position when the other one moves toward the blocking position, and vice versa.

Two valve seats in the casing cavity respectively divide two portions of the cavity communicating with the two controlled outlets from the cavity portion which communicates with the inlet. Two valve members are arranged for movement toward and away from respective valve closing positions in which each engages a valve seat and closes the opening thereof. The valve elements are urged toward their seats by yieldably resilient means, and are moved away therefrom by respective abutment means associated with the plungers when the associated plunger moves in a direction toward its blocking position. Movement of the plungers is actuated by suitable mechanism, preferably dual pilot valves and actuating pistons controlled by the pilot valves.

Preferred embodiments of the invention will be described hereinafter with reference to the accompanying drawings. However, it will be understood that the invention is not limited to the illustrated examples.

In the drawings:

FIG. 4 shows the valve of FIG. 3 in an operative position.

Figure 1:
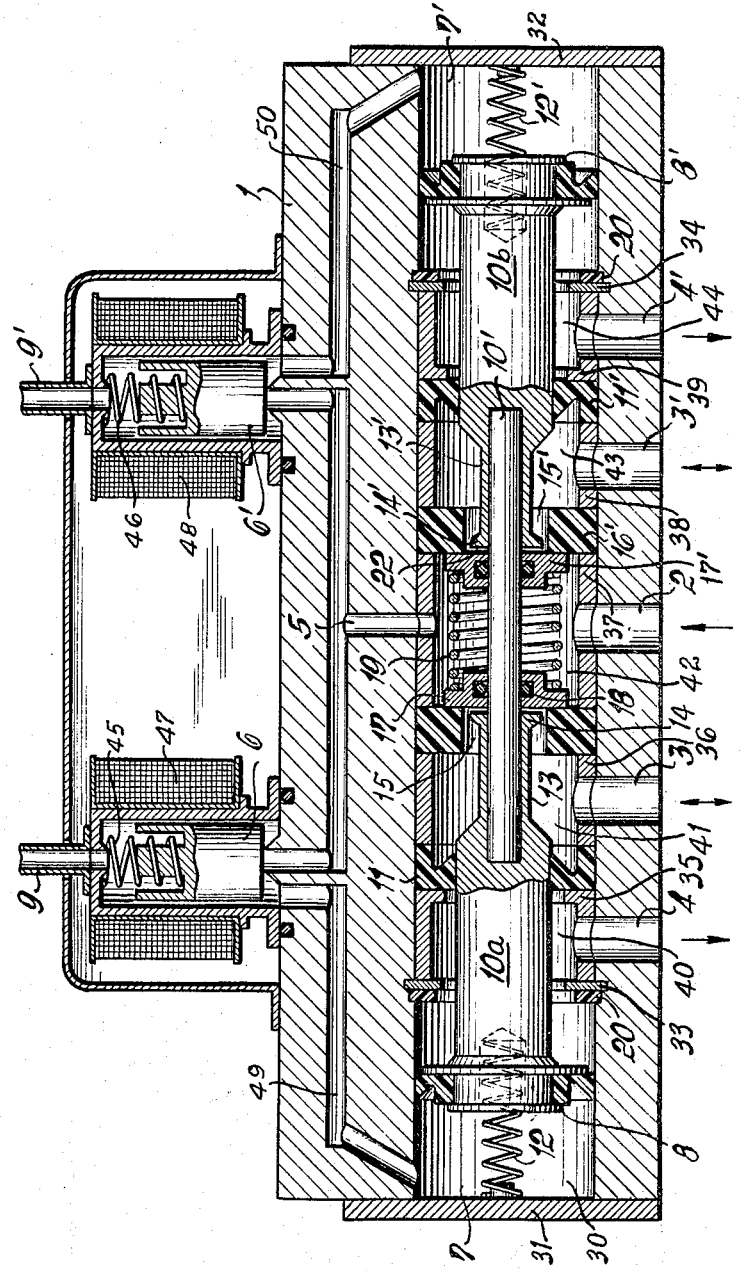
FIG. 1 shows a three-position control valve according to the invention in elevational section, the valve being shown in its neutral position.

The valve illustrated in FIG. 1 has a valve casing 1 provided with a pressure fluid inlet 2, controlled outlets 3, 3′ for connection to a hydraulic actuator not shown in the drawing, such as a double-acting hydraulic cylinder, and outlets 4 and 4′ for the return of the hydraulic fluid, such as oil, from the actuator. The valve casing has a cylindrical bore 30 which is axially closed by end plates 31, 32. Two rings 33, 34 partly received in the wall of the bore 30 axially secure an assembly of five tubular spacers 35, 36, 37, 38, 39, and of four interposed annular resilient elements which define five axially consecutive compartments or chambers 40, 41, 42, 43, 44, between the rings 33, 34. The spacers 35–39 have radial apertures which are aligned, in axial sequence, with the return outlet 4, the controlled outlet 3, the pressure fluid inlet 2, the controlled outlet 3′, and the return outlet 4′.

The axially central chamber 42 is connected by a branched conduit 5 with two solenoid pilot valves 6, 6′ which normally block respective orifices of the conduit 5 under the pressure of return springs 45, 46, and open the orifices when the coils 47, 48 of the valves are energized. The pilot valve 6 is connected by a permanently open conduit 49 to a chamber 7 between the plate 31 and the ring 33 in which a piston 8 is axially slidable. An outlet 9 of the pilot valve 6 communicates with the conduit 49 in the illustrated position of the pilot valve and vents the chamber 7. When the coil 47 is energized, pressure fluid is admitted to the piston 8. The pilot valve 6′ controls the pressure in chamber 7′ between the ring 34 and the plate 32 containing a piston 8′ in an analogous manner. The pilot valve 6′ has an outlet 9′.

The piston 8, 8′ are attached to respective plungers 10a, 10b. In the neutral valve position of FIG. 1, the cylindrical outer parts of the plungers pass with ample clearance through the rings 33, 34 and slidably engage respective sealing rings 11, 11′ between the chambers 40, 41 and the chambers 43, 44. The sealing lip of each ring faces toward the central chamber 42, and therefore does not ride across a control edge when the associated plunger shifts. This greatly extends the life of the seals.

The two plungers 10a, 10b are connected by a coaxial rod 10′ whose ends are loosely inserted in axial bores of the plungers. The plunger assembly is held together by two centering springs 12, 12′ which respectively abut against the plates 31, 32. The inner ends of the plungers taper toward respective coaxial extensions 13, 13′ whose enlarged free ends form abutments 14, 14′. The abutments are dimensioned so as to pass through openings 15, 15′ of disc-shaped valve seats 16, 16′ without preventing flow of fluid through the openings. The valve seats 16, 16′ are of yieldably resilient material and are axially secured in the casing 1 by the spacers 36, 37, 38 on either side of the central chamber 42.

The valve seats 16, 16′ cooperate with disc-shaped valve elements 17, 17′ which are slidably mounted on the rod 10′ and each enclose a sealing washer 18 in engagement with the rod. The valve elements 17, 17′ are urged in opposite directions towards respective valve seats 16, 16′ by an interposed helical spring 19 and they normally keep the valve openings 15, 15′ closed.

In the illustrated neutral position of FIG. 1 communication between the pressure fluid inlet 2 and the two controlled outlets 3 and 3′ is interrupted by the valve elements 17, 17′, whereas the plungers 10a, 10b separate the controlled outlets 3 and 3′ from the return outlets 4 and 4′. Any axial clearance between the abutments 14, 14′ and the valve elements 17, 17′ does not influence the sealing effect of the valve. It is therefore possible to allow a suitable tolerance for slight variations in the relative positions of the valve elements 17, 17′ and their seats because of wear and the like.

Figure 2:
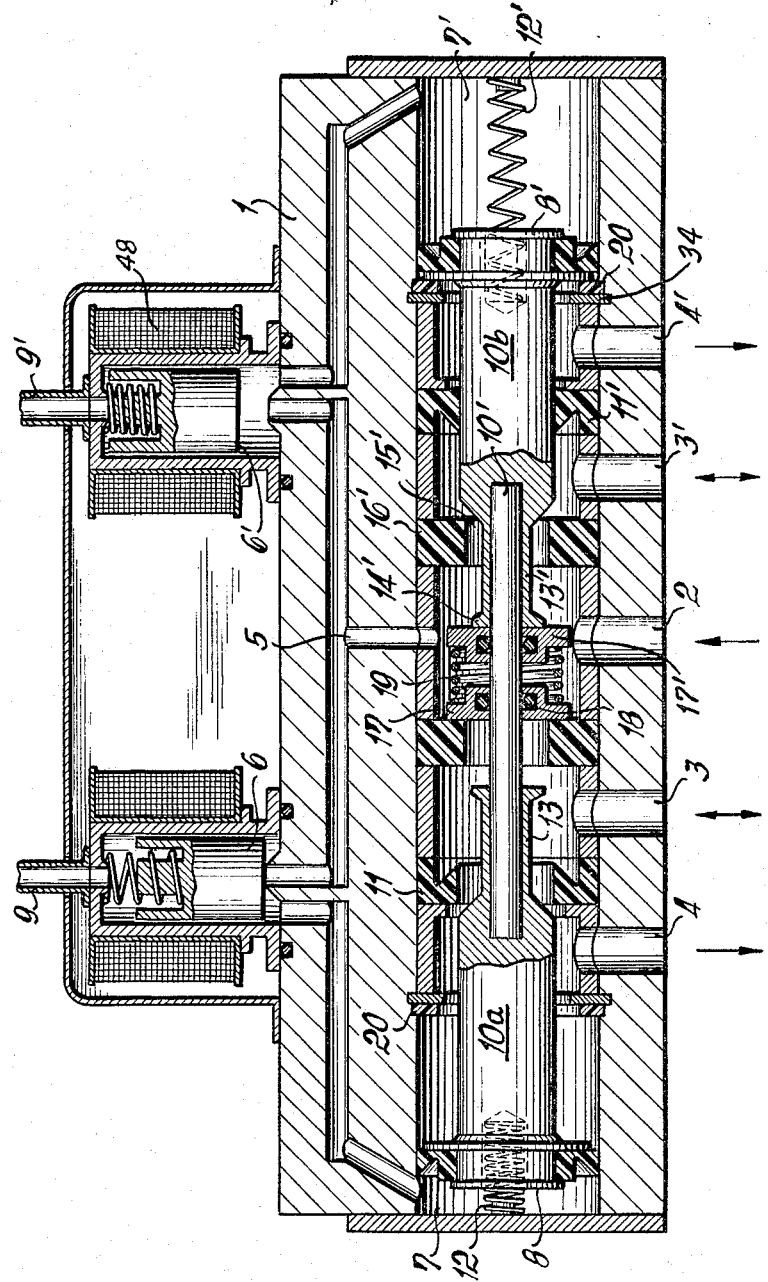
FIG. 2 shows the valve of FIG. 1 in an operative position.

When the solenoid coil 48 of the pilot valve 6′ is energized, as illustrated in FIG. 2, fluid pressure is the chamber 7' forces the piston 8' against a resilient abutment facing 20 on the ring 34. The piston 8' shifts the plunger 10b toward the central chamber 42 and thereby opens communication between the pressure fluid inlet 2 and the controlled outlet 3' to the actuator, because the abutment 14' on the associated extension 13' lifts the valve element 17' off its seat 16' with simultaneous compression of the spring 19.

The other valve element 17 remains in the closing position, but the rod 10' pushes the plunger 10a out of its sealing ring 11 and thereby opens a path of communication between the controlled outlet 3 and the return outlet 4. When the pilot valve 6' is deenergized, the chamber 7' is connected with the outlet 9' of the pilot valve, and the springs 12, 12', 19 return all valve members to their neutral positions. The actuator is blocked.

When the pilot valve 6 is opened and closed, the control valve responds in a corresponding manner.

Figure 3:
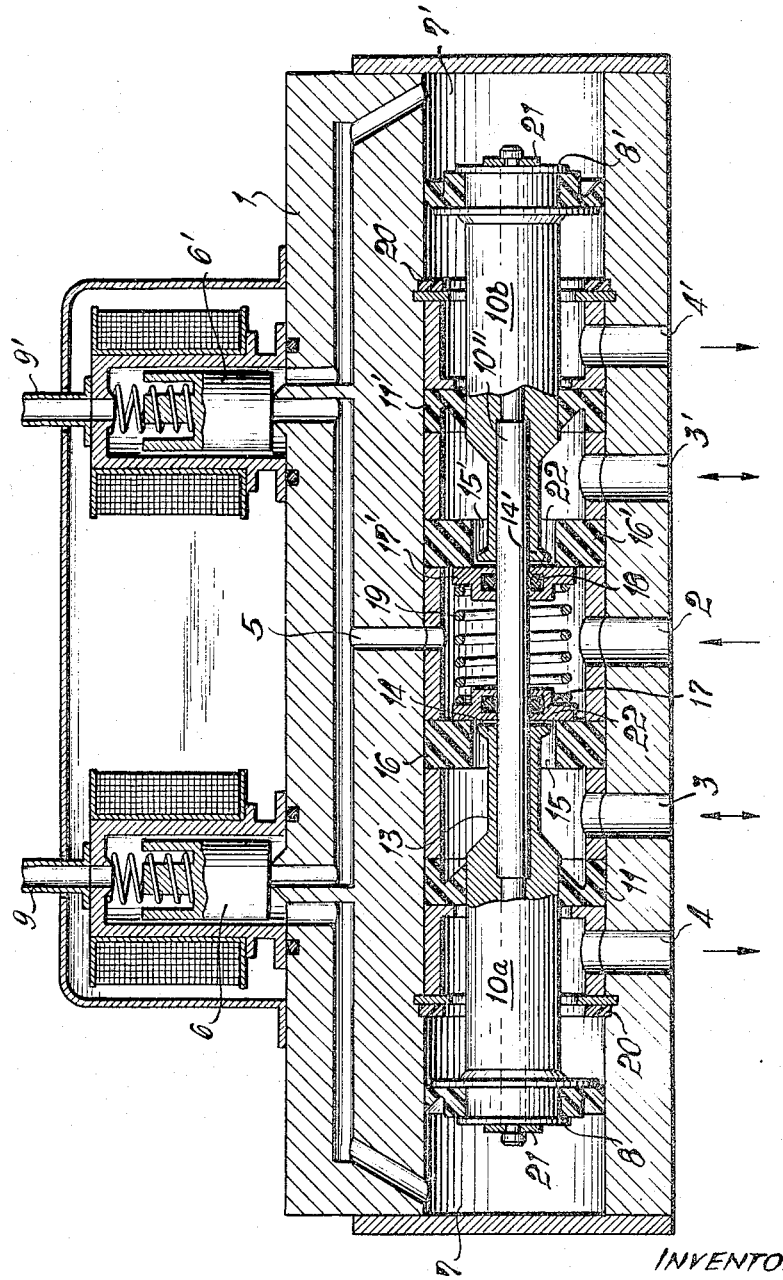
FIG. 3 illustrates a modified three-position control valve according to the invention in elevational section.

The modified embodiment of the invention shown in FIG. 3 differs from the afore-described device by a rod 10'' which is fixedly attached to the plungers 10a, 10b by washers 21 on the pistons 8 and 8', and by omission of the springs 12, 12'.

The valve is urged into its neutral position by the spring 19. Fluid pressure acting through an open valve 17 or 17' on the corresponding plunger provides a part of the restoring force until the valve element has reached its closing position.

If rigid valve seats 16, 16' are preferred, the valve elements 17, 17' are provided with resilient sealing facings.

In the embodiment illustrated in FIG. 3, a slight clearance should be provided between the abutments 14, 14' and the valve elements 17, 17' when the valve is in the neutral position. This clearance is indicated in FIG. 3 at 22. It is also desirable to affix the rod 10'' to the plungers 10a, 10b in an adjustable manner to permit this clearance 22 to be varied. In the embodiment according to FIG. 1 shims may be inserted into the plunger bores for increasing this clearance, or the clearance can be reduced by removing some of the shims.

In the embodiment according to FIG. 3, the clearance between the valve elements 17, 17' and the cooperating abutments 14, 14' can be made adjutable by providing threaded connections between the rod and the plungers.

FIG. 4 shows the position of the control valve according to FIG. 3 after energizing of pilot valve 6'. The piston 8' is in contact with the associated abutment facing 20. The piston 8 is closely adjacent the end plate 31, and communication is established between the return outlet 4 and the controlled outlet 3. The valve opening 15' is open.

I claim:
1. A control valve comprising, in combination:
   (a) a valve casing formed with a cavity having a plurality of portions and with inlet means, two controlled outlets, and two return outlet means, said inlet means, outlets, and outlet means communicating with respective portions of said cavity;
   (b) two plunger members in said cavity, each plunger member being movable toward and away from a blocking position in which said plunger member sealingly engages said casing in said cavity for separating a portion of said cavity communicating with an associated controlled outlet from another portion of said cavity communicating with an associated return outlet means;
   (c) motion transmitting means connecting said plunger members for movement of each plunger member away from the blocking position thereof when the other plunger member moves toward the blocking position of the same, and for movement of each plunger member toward the blocking position thereof when the other plunger member moves away from the blocking position of the same;
   (d) two valve seats interposed in said cavity between respective portions of said cavity communicating with said two controlled outlets and the portion of said cavity communicating with said inlet means, each valve seat being formed with a valve opening;
   (e) two valve elements movable in said cavity toward and away from respective valve closing positions in which said valve elements engage respective valve seats and close the openings thereof;
   (f) yieldably resilient means biasing said valve elements toward the respective valve closing positions; and
   (g) abutment means associated with each of said plunger members for joint movement, each abutment means engaging one of said valve elements for moving the same away from the closing position thereof, and for thereby opening communication between the associated controlled outlet and said inlet means when the associated plunger moves in a direction toward said blocking position thereof; and
   (h) actuating means for actuating said movement of said plunger members.

2. A valve as set forth in claim 1, wherein said actuating means include a piston member in said cavity in slidable sealing engagement with said casing, said piston member being operatively connected to one of said plunger members for joint movement, and valve means for admitting pressure fluid to a portion of said cavity contiguously adjacent said piston member.

3. A valve as set forth in claim 1, wherein said actuating means include two piston members in said cavity in slidable sealing engagement with said casing, each piston member being operatively connected to one of said plunger members for joint movement, and valve means for admitting pressure fluid to respective portions of said cavity contiguously adjacent said piston members and for venting said cavity portions, and for thereby moving said plunger members.

4. A control valve comprising, in combination:
   (a) a valve casing formed with a cavity having a plurality of portions and with inlet means, two controlled outlets, and two return outlet means, said inlet means, outlets, and outlet means communicating with respective portions of said cavity;
   (b) two plunger members in said cavity;
   (c) motion transmitting means connecting said plunger members for movement of said plunger member from a first to a second, and thence to a third position when the other plunger member moves from a third to a second, and thence to a first position of the same, and for moving each plunger from the third to the second, and thence to the first position thereof, when the other plunger member moves from the first to the second, and thence to the third position of the same,
      (1) each plunger member when in said first and second positions sealingly engaging a portion of said casing in said cavity for separating a portion of said cavity communicating with an associated controlled outlet from another portion of said cavity communicating with an associated return outlet means;
      (2) each plunger member when in said third position being spaced from said casing portion for permitting communication between said associated controlled outlet and said associated return outlet means;
   (d) two valve seats interposed in said cavity between respective portions of said cavity communicating with said two controlled outlets and the portion of said cavity communicating with said inlet means, each valve seat being formed with a valve opening;

5. A valve as set forth in claim 4, wherein said cavity has an axis and said portions of said cavity are axially juxtaposed, said plunger members are connected by said motion transmitting means for joint axial movement in said cavity, said first, second, and third positions of each plunger member are axially spaced from each other, and said valve elements are moved axially away from said closing positions thereof by the engaged abutment means, said valve opening connecting two axially juxtaposed portions of said cavity.

6. A valve as set forth in claim 4, wherein each valve element and the associated valve seat constitute a pair of valve members, one of said valve members being of yieldably resilient material, and the other valve member being of rigid material.

7. A valve as set forth in claim 5, wherein said valve seats are secured on said casing against axial movement.
  (e) two valve elements movable in said cavity toward and away from respective valve closing positions in which said valve elements engage respective valve seats and close the openings thereof;
  (f) yieldably resilient means biasing said valve elements toward the respective valve closing positions; and
  (g) abutment means associated with each of said plunger members for joint movement, each abutment means engaging one of said valve elements for moving the same away from the closing position thereof, and for thereby opening communication between the associated controlled outlet and said inlet means when the associated plunger member moves from said second to said first position thereof; and
  (h) actuating means for actuating said movement of said plunger members.

8. A valve as set forth in claim 5, wherein said two valve seats define therebetween a central portion of said cavity communicating with said inlet means, and axially separate said central portion from respective adjoining portions of said cavity communicating with said controlled outlets, said casing including two apertured sealing means spaced from said central portion and interposed between each of said adjoining portions, and respective further portions of said cavity communicating with said return outlet means, said plunger members when in said first and second positions thereof sealingly engaging respective apertures of said two sealing means.

9. A valve as set forth in claim 8, wherein said abutment means each include an abutment member fixedly fastened to the respective plunger member and extending therefrom axially in a direction from the associated sealing means toward said central cavity portion, said abutment member freely passing through the aperture of the associated sealing means when the associated plunger member is in the third position thereof in such a manner that fluid may flow between the associated adjoining cavity portion and the associated further cavity portion.

10. A valve as set forth in claim 9, wherein at least one of said abutment members is spaced from the associated valve elements when said plunger members are in said second positions thereof.

References Cited by the Examiner
UNITED STATES PATENTS 2,216,854  10/1940  Sanford _____ 137—627.5 X
3,025,881  3/1962   Freeman _____ 137—627.5

WILLIAM F. O'DEA, *Primary Examiner.*

CLARENCE R. GORDON, *Assistant Examiner.*